United States Patent
Bjorken

(10) Patent No.: US 8,903,400 B2
(45) Date of Patent: Dec. 2, 2014

(54) METHOD AND A DEVICE FOR DYNAMIC FREQUENCY USE IN A CELLULAR NETWORK

(75) Inventor: Peter Bjorken, Solna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 970 days.

(21) Appl. No.: 12/530,724

(22) PCT Filed: Mar. 30, 2007

(86) PCT No.: PCT/SE2007/050202
§ 371 (c)(1),
(2), (4) Date: Sep. 10, 2009

(87) PCT Pub. No.: WO2008/121037
PCT Pub. Date: Oct. 9, 2008

(65) Prior Publication Data
US 2010/0113029 A1    May 6, 2010

(51) Int. Cl.
| | |
|---|---|
| *H04W 36/00* | (2009.01) |
| *H04W 36/14* | (2009.01) |
| *H04W 24/02* | (2009.01) |
| *H04W 84/04* | (2009.01) |
| *H04W 92/22* | (2009.01) |

(52) U.S. Cl.
CPC .......... *H04W 36/0066* (2013.01); *H04W 36/14* (2013.01); *H04W 24/02* (2013.01); *H04W 84/045* (2013.01); *H04W 92/22* (2013.01)
USPC .......................................... 455/437; 455/436

(58) Field of Classification Search
CPC ..... H04W 36/30; H04W 24/00; H04W 88/08; H04W 88/14; H04W 60/00
USPC .............. 455/437, 436, 424, 561, 560, 435.1; 370/332
See application file for complete search history.

(56) References Cited

U.S. PATENT DOCUMENTS 6,801,772 B1 * 10/2004 Townend et al. .............. 455/436
2002/0151304 A1    10/2002 Hogan
(Continued)

FOREIGN PATENT DOCUMENTS

EP      1 135 949 A1    9/2001
JP      2005142967 A    6/2005
(Continued)

OTHER PUBLICATIONS

International Search Report dated Feb. 6, 2008 (4 pages).
Written Opinion dated Feb. 6, 2008 (5 pages).
ETSI TR 121 905 v7.2.0 (Jun. 2006): "Digital cellular telecommunications system (phase 2+); Universal Mobile Telecommunications System (UMTS); Vocabulary for 3GPP specifications (3GPP TR 21.905 version 7.2.0 release 7)", p. 14, line 1-p. 17, line 26; p. 23, line 15-p. 29, line 18 (11 total pages).
(Continued)

*Primary Examiner* — Kiet Doan
*Assistant Examiner* — Alexander Yi
(74) *Attorney, Agent, or Firm* — Myers Bigel Sibley & Sajovec, PA

(57) ABSTRACT

A method for a network (100) with cells of first and a second kind with corresponding base stations. The network (100) comprises functions for control of the base stations of the first and second kinds and for handing over control of user terminals between base stations, the method being used when a user terminal (123) in a cell of the second kind (120-122) is handed over to a base station (111) of a cell (110) of the first kind. The method lets said control function (140) of the base station of the cell of the first kind send instructions to the control function (140) of the base station (111) of the second kind regarding at least one or more frequencies on which the base station of the second kind may operate, or an identity code which may be used by the base station of the second kind.

20 Claims, 4 Drawing Sheets

(56) References Cited

U.S. PATENT DOCUMENTS

| | | | |
|---|---|---|---|
| 2005/0099972 A1 | 5/2005 | Motegi et al. | |
| 2005/0130662 A1 | 6/2005 | Murai | |
| 2005/0148368 A1* | 7/2005 | Scheinert et al. | 455/561 |
| 2005/0202828 A1 | 9/2005 | Pecen et al. | |
| 2005/0255890 A1 | 11/2005 | Nakada | |
| 2007/0254620 A1 | 11/2007 | Lindqvist et al. | |
| 2008/0008127 A1* | 1/2008 | Choi et al. | 370/331 |
| 2008/0096553 A1* | 4/2008 | Saksena et al. | 455/426.2 |

FOREIGN PATENT DOCUMENTS

| | | | |
|---|---|---|---|
| JP | 2005328152 A | 11/2005 |
| WO | WO 00/35230 A1 | 6/2000 |
| WO | WO 2004/034715 A1 | 4/2004 |
| WO | WO 2005/027556 A1 | 3/2005 |
| WO | WO 2007/080397 A2 | 7/2007 |

OTHER PUBLICATIONS

ETSI TR 125 922 v6.0.1 (Apr. 2004): "Universal Mobile telecommunications system (UMTS); Radio resource management strategies (3GPP TR 25.922 version 6.0.1 Release 6)", p. 14, line 1-p. 22, line 25 (9 total pages).

European Office Action Corresponding to European Application No. 07 748 363.4; Dated: Jan. 30, 2013; 7 Pages.

European Search Report Corresponding to European Application No. 07 748 363.4; Dated: Jan. 21, 2013; 4 Pages.

Saksena et al. "Wireless Handset Communication Network", U.S. Appl. No. 60/862,353, filed Oct. 20, 2006.

Office Action and English Translation, JP Patent Application No. ZO10-500869, 3 pages, Sep. 9, 2011.

* cited by examiner

METHOD AND A DEVICE FOR DYNAMIC FREQUENCY USE IN A CELLULAR NETWORK

TECHNICAL FIELD

The present invention discloses a method for improved coexistence between cells of different kinds in a cellular network. The different kinds of cell may be, for example, GSM cells together with LTE cells or so called Femto cells.

BACKGROUND

So called Femto Base Transceiver Stations, Femto BTS, are being developed in order to provide GSM and/or WCDMA coverage for end users in limited coverage areas, e.g. private homes or offices. A Femto BTS in a GSM system will typically be connected to a Femto Base Station Controller, BSC, and in the WCDMA case there will usually be a Femto Radio Network Controller, Femto RNC, for the Femto BTS.

Another system which is currently under development is the Long Term Evolution project, LTE, which is being developed in order to provide higher bit rates and capacity for packet switched services. An LTE BTS may be a separate base station, or it may be combined with a base station from another system, such as GSM or WCDMA.

For both Femto and LTE BTSs, there is thus a high likelihood of "joint coverage" with another system, such as GSM or WCDMA, since both Femto BTSs and LTE BTSs may be deployed within or adjacent to such cells, and may in fact, at least in the Femto case, share the physical BSC or RNC with a GSM or WCDMA system.

As explained above, there may thus in future networks be coexistence between cells of different kinds, e.g. GSM or WCDMA with Femto or LTE cells. This coexistence places specials demands on the frequency planning in the network. For example, the Femto concept as such will require a particularly robust way of handling the frequency planning in networks with "shared systems", i.e. both Femto and GSM or WCDMA, since it is possible that users may be able to purchase Femto BTSs "over the counter" and deploy them wherever the user deems necessary and/or desirable, in some cases even without the prior consent of the operator of the larger network, e.g. GSM or WCDMA.

In networks where there is coexistence between GSM and/or WCDMA and LTE systems, there will also be a special need for elaborate frequency planning.

SUMMARY

As explained above, there is thus a need for a solution by means of which frequency planning can be carried out in an improved fashion in networks with different kinds of cells which at least partially cover the same area.

This need is addressed by the present invention in that it provides a method for use in a cellular telephony network in which there is a first number of cells of a first kind, each of which is able to accommodate at least a first number of user terminals, with traffic of the user terminals being controlled by a corresponding base station. In the network in which the invention may be applied, there is also a second number of cells of a second kind, each of which is able to accommodate at least a second number of user terminals, with traffic of the user terminals being controlled by a corresponding base station.

The second kind of cells have a coverage which at least partially coincides with the coverage of one or more cell of the first kind, and the network also comprises functions for control of the base stations of the first and second kinds, as well as functions for handing over the control of user terminals from one base station to another base station.

The method of the invention is in particular intended for use when the control of a user terminal in a cell of the second kind is handed over to a base station of a cell of the first kind.

According to the method of the invention, the control function for the base station of the cell of the first kind sends instructions to the control function of the base station of the second kind, the instructions comprising information regarding one or more frequencies on which the base station of the second kind may operate and/or an identity code which may be used by the base station of the second kind.

Thus, by means of the invention, a method is provided which will enable a "shared" network to handle frequency planning in a dynamic fashion, as will become even more evident from the following detailed description of the invention.

The invention also discloses a node for use in a system of the invention.

BRIEF DESCRIPTION OF THE DRAWINGS

The invention will be described in more detail in the following, with the aid of the appended drawings, in which.

DETAILED DESCRIPTION

Figure 1:
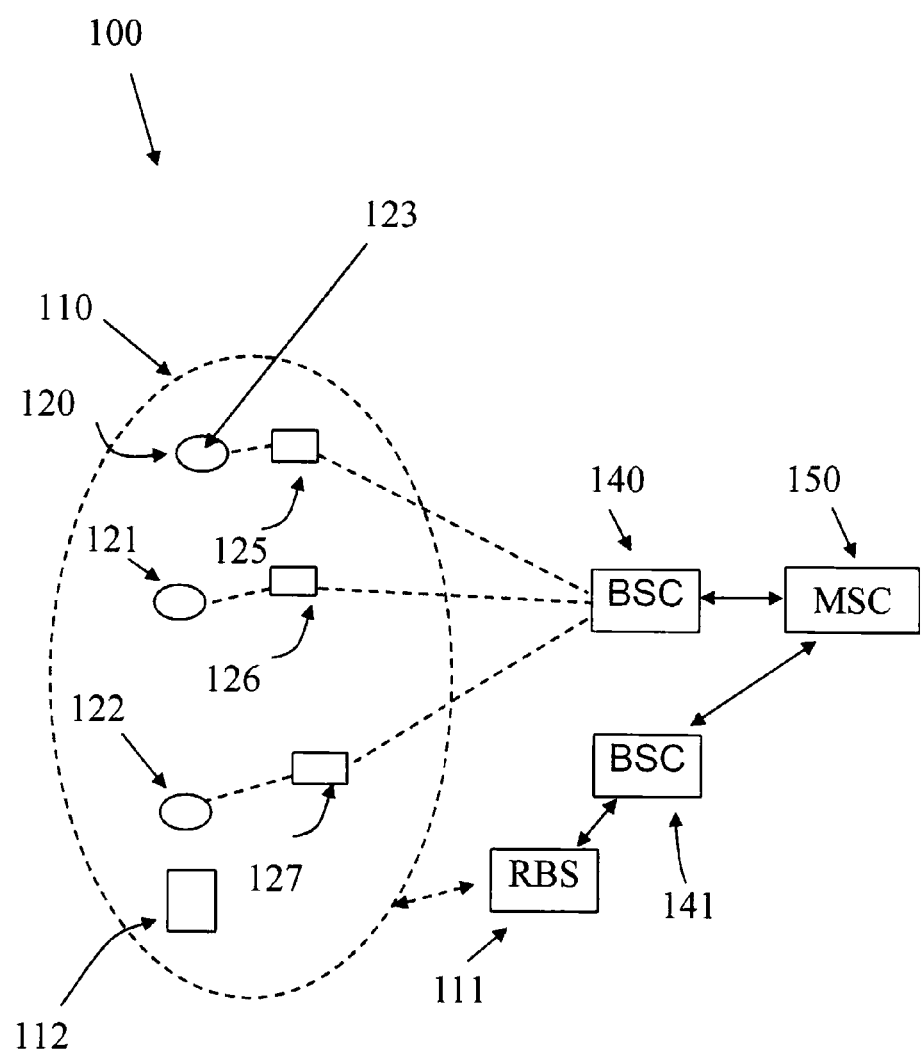
FIGS. 1 and 2 show networks in which the invention may be applied.

FIG. 1 shows a network 100 in which the invention may be applied. Before the network 100 is described in more detail, it should be pointed out that although the network 100 will essentially be described as a GSM system within or adjacent to which there are Femto cells or LTE cells, this is by way of example only, and is merely intended to facilitate the reader's understanding of the invention, it is not intended to restrict the scope of protection sought for the present invention. On the contrary, the invention can be applied to networks in which there is coexistence between various kinds of "Macro" cells and Femto and/or LTE cells. One such example of "Macro" cells of another kind in a network of the invention could be WCDMA cells instead of GSM cells.

In the same manner, although the terminology used in describing the invention will mainly be GSM-terminology, this is also merely by way of example. Thus, for example, the term Base Transceiver Station refers to a function which in other systems has other names, such as for example, Node B. Such systems are also within the scope of a network in which the present invention may be applied.

It should also be mentioned that the invention can be applied in a system in which there are both Femto BTSs and LTE BTSs within a Macro system.

Returning now to FIG. 1 and the network 100 shown there, the network 100 comprises a number of cells of a first kind, "Macro" cells, one of which is shown as 110, and which is controlled by a BTS 111. The Macro cells can accommodate a number of user terminals, one of which is symbolically shown with the reference number 112 in the cell 110. The Macro BTS 111 is in turn controlled by a Macro Base Station Controller 141, and is connected to a Mobile Services Switching Centre 150.

Figure 2:
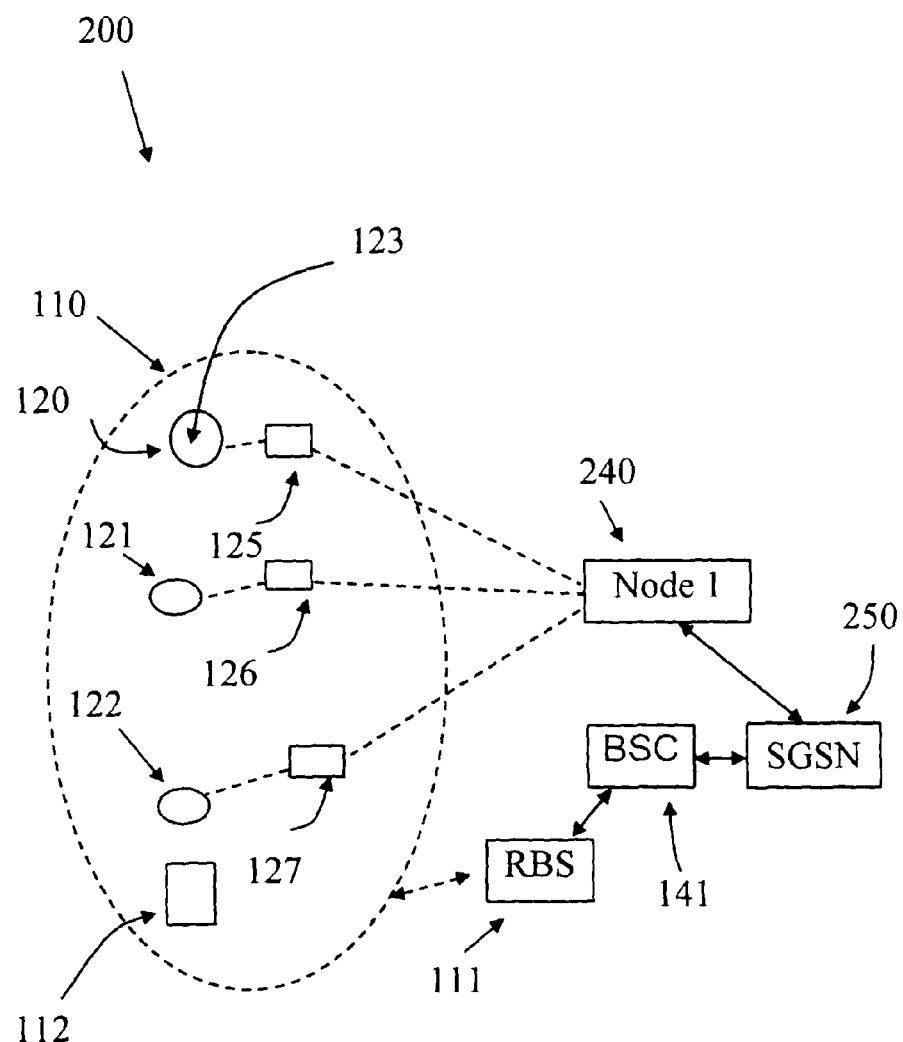

The system 100 of FIG. 1 also comprises a number of cells 120-122 of a second kind, for example so called "Femto" cells or LTE cells. The second kind of cells are shown in FIGS. 1 and 2 as being completely within the coverage area of the "Macro" cell 110, but this is merely an example, the second kind of cells can also have only a partial "overlap" with the Macro cell or cells in the network.

Although the basic principle of the invention is the same for Femto and LTE cells within the Macro system, the invention will be first be described below with reference to FIG. 1 for the Femto case, following which the LTE case will be described in connection to a separate figure, FIG. 2.

Case 1, Femto Cells in Combination with Macro Cells

In the example shown in FIG. 1, each of the Femto cells 120-122 is controlled by a corresponding Femto BTS 125-127. The Femto BTSs are in turn controlled by a Femto Base Station Controller 140, and are in the example shown in FIG. 1 connected to the same MSC 150 as the Macro cell 110. This, however, is merely an example, the Femto BSC and the Macro BSC can also be connected to separate MSCs. The Femto BSC can be one and the same physical unit as the Macro BSC, or they can be separate physical units, as indicated in FIG. 1.

The intended function of the Femto cells 120-122 and their BTSs 125-127 is essentially the same as that of the Macro cell 110 and its BTS 111, and for that reason their function will not be explained in further detail here, but a difference as compared to "traditional" cells and their BTSs is that the Femto cells are intended to cover much smaller areas than a traditional cell such as the cell 110. Typical areas of use for a Femto cell would be a home or a small office.

A problem to be addressed by the present invention is that the cells of the second kind, in this example the Femto cells, can be deployed more or less arbitrarily by a user, in some cases even without prior permission from the operator of the system, and it will also be possible for a user to redeploy his Femto BTS to a new site without informing the operator of the system. This, in addition to the large number of Femto cells which it will be possible to deploy within a Macro system, for example a GSM or WCDMA system, makes it difficult for the operator of the system to carry out frequency planning of the system in an efficient manner.

According to a basic principle of the present invention, the Macro system will monitor the coverage area of the network in order to detect any Femto BTSs which have been deployed within the coverage of the Macro system. If any new Femto BTSs are detected, or if existing ones are re-detected, the Macro system will act to send instructions to the Femto BTS regarding at least which frequency that the Femto BTS may operate on. Usually, these instructions will be routed to a BTS via its BSC.

Suitably, the instructions to the Femto BTS from the Macro system will also comprise information on which identity code the Femto BTS should use, which will usually be in the form of a so called BSIC, Base Station Identity Code, and possibly also a so called TSC, Training Sequence Code. However, the instructions from the Macro system can also be exclusively on the identity code that the Femto BTS should use.

Thus, in a preferred embodiment, the Macro system instructs the Femto BTS on both the frequency and the BSIC that the Femto BTS should use, although the instructions to the Femto BTS may comprise only one of these parameters as well.

The way that the Macro system can detect the presence of Femto BTSs is as follows: the presence of a Femto BTS 125-127 can be detected if and when the Femto BTS, or rather a user in the Femto cell 120-122 which is controlled by the Femto BTS 125-127, causes a hand over to the Macro cell 110 which is controlled by the Macro BTS 111.

The request for hand over from the Femto BTS to the Macro BTS is sent to the MSC 150 from the Femto BSC 140, and is sent from the MSC 150 to the target BSC, in this case the Macro BSC 141.

The handover request message will contain information which identifies the serving BTS, for example the serving CGI information. The target BSC 141 will notice that the CGI does not belong to a cell or a BTS which it has information about, and can thus conclude that there is a new BTS in the coverage area of the Macro BTS 111. Using this information, the target BSC 141, i.e. the Macro BSC, will determine a suitable operating frequency for the new BTS, and also a suitable BSIC for it, and will instruct the new BTS accordingly. The instructions can be sent as the result of a handover request, or as the result of having detected for example a number of such handover requests.

These instructions will be sent from the target BSC 141 to the serving BSC 140 via the MSC 150 as a so called IE, information element, which can either be comprised in an existing message in the standard of the system, or in a new message defined in order to obtain the results of the invention. The IE in question can be addressed by the target BSC by means of the "serving CGI" which is information that is comprised in the message which requested the handover.

If the BTS 125-127 which is "discovered" by the Macro BSC 141 is completely new to the Macro BSC, the Macro BSC may need to know the location of the new BTS in order to determine a suitable working frequency for it, as well as a suitable BSIC. The location of the new BTS can be determined by the Macro BSC in a number of ways, some of which are listed in the following:

- The target CGI of the handover request. This can be used by the target BSC in order to determine which Macro cell's coverage area that the new BTS is located in.
- The so called timing advance information of the User Terminal in the new cell. This can be used in order to determine an approximate distance from the Macro BTS for the User Terminal, which can in turn be used to determine the distance of the outskirts of the Femto cell from the Macro BTS.
- Information from the User Terminal regarding the measured signal strength of signals from surrounding Macro Cells after the handover, which can be used in the same manner as the timing advance information.
- External positioning systems, such as the GPS system. It can be envisioned that the Macro BSC orders the User Terminal to carry out a GPS positioning in order to accurately determine the initial position of the user Terminal in the Macro cell.

In the case described above, the Macro system discovers a new BTS within the coverage area of the macro system, but the Macro system does not know conclusively that the new BTS is a Femto BTS. The instructions to the new BTS must thus be made while covering a number of possibilities, one of which is that the new BTS is a Femto BTS.

Another case, which is also covered by the present invention, is that the Handover Request from the Femto BSC comprises specific information which signals that the serving cell, i.e. the cell from which handover is requested, is a cell of a certain kind, for example a Femto cell. If such information about the serving cell is available in messages in the network in which the invention is applied, the Macro BSC could be limited to only send instructions regarding operating frequency and/or BSIC in the case that the serving cell is a cell of a certain kind, such as, for example, a Femto cell. In this case as well as the one described previously, the Macro system can use information about where the Femto cell is located, as described above, in order to arrive at a suitable operating frequency and/or BSIC for the Femto BTS. The instructions regarding the operating frequency and/or BSIC are suitably sent by the Macro BSC to the serving BSC, i.e. the Femto BSC, using the serving CGI from the handover request message as the address.

Yet another case which is also covered by the present invention is that the Macro system, e.g. by means of a function in the target BSC, can recognize that a certain CGI corresponds to a Femto BTS. Since the CGI is comprised in the message which requests a handover to the Macro system, the Macro system can, for example by means of the suggested function in the Macro MSC, recognize that the serving BTS is a Femto cell, and use this information in order to instruct the serving BTS to use a suitable operating frequency and/or BSIC. In this case as well as those described previously, the Macro system can use information about where the Femto cell is located, as described above, in order to arrive at a suitable operating frequency and/or BSIC for the Femto BTS. The instructions regarding the operating frequency and/or BSIC are suitably sent by the Macro BSC to the serving BSC, i.e. the Femto BSC, using the serving CGI from the handover request message as the address.

In the description above, it has been assumed that the Femto BTS is one which is newly discovered by the Macro BSC. However, the invention can also be applied in the case that the Femto BTS is not one which is new to the Macro BSC, but is a Femto BTS which the Macro system has detected previously. In such a case, the information regarding the handover from the Femto BTS to the Macro BTS can be used by the target BSC to update its information on the Femto BTS, and to check if the current frequency and/or BSIC used by the Femto BTS should be changed or not.

It should also be mentioned that the frequency and/or BSIC which the Femto BTS is instructed by the Macro system regarding can also be frequencies and/or BSICs which are unsuitable for use by the Femto BTS. Using such an instruction, the Femto BTS would come to a decision on its own regarding frequencies and/or BSICs which are suitable for use.

As an additional alternative, the instructions to the Femto BTS could comprise a list of allowed frequencies and BSICs which would be allowed for the BTS to use.

The instructions from the Macro system to the Femto BTS regarding the parameters (frequency and/or BSIC) can suitably be determined by a function for this in the Macro system, for example in the Macro BSC. Such a function would, for example, use information regarding which specific parameters that are in use in the Macro system in order to conclude which parameters that are or are not suitable for use by the Femto BTS. In particular, as has been described above, the decision can be aided by information regarding the location of the Femto BTS in the Macro system, by means of which it can be ensured that the parameters used by the Femto BTS cause a minimum of interference in the Macro system and to other Femto cells in the network.

Case 2, LTE Cells in Combination with Macro Cells

As has been mentioned previously, the invention can also be applied to a network in which LTE cells are deployed together with the Macro cells, i.e. cells from, for example, the GSM or WCDMA systems. The function of a network in which the invention is applied is basically the same if the network comprises LTE cells in combination with Macro cells, or if the network comprises Femto cells in combination with Macro cells, as described above with reference to FIG. 1.

However, as will be described below with reference to FIG. 2, there are a few differences in such an embodiment of the invention, mainly in the structure of the system rather than the function of the invention. Thus, FIG. 2 shows a system 200 which is similar to the system 100 of FIG. 1, but which has been modified to show LTE cells 120-122 in combination with a Macro system, instead of Femto cells. In FIG. 2, components with the same basic functions as those of FIG. 1 have been given the same reference numerals.

As planned at present, the LTE system will not comprise a BSC. Instead, as indicated in FIG. 2, the LTE BTSs 125-127 will be connected to a node 240 ("Node 1") in the core network, which in turn communicates with the GSM system via an SGSN 250, or a node with a similar function in the WCDMA system. The SGSN 250 then communicates with the BSC 141 of the GSM system.

The principle of letting the Macro system use handover requests from the LTE cell to a Macro Cell to detect LTE cells or to update the Macro system's information regarding LTE cells that are deployed in the coverage area of the Macro system is the same in this embodiment of the invention. However, one difference is the instructions which the Macro system may send to the LTE BTS: the LTE BTS may need to operate on more than one frequency, which can also be expressed as a frequency spectrum within which the LTE BTS may operate.

Thus, when the Macro system detects an LTE BTS (new or updated) by means of a requested handover, the Macro system can use this as an opportunity to determine a suitable frequency spectrum or a number of frequencies on which the LTE BTS may operate, and may include this in the instructions to the LTE BTS. In order to determine the suitable frequency spectrum or frequencies for the LTE BTS, the Macro system can, for example, check the frequencies used by the Macro system in the vicinity of the LTE BTS, in order to arrive at a suitable spectrum or frequencies for the LTE BTS.

The determination of the location of the LTE BTS may be done in the same manner as described in the case of Femto cells in a Macro system.

The instructions from the Macro system to the LTE BTS are sent in the same way as in the case with the Femto cells, i.e. via an information Element, IE, which is either new to the system/systems, or an existing IE can be used.

Figure 3:
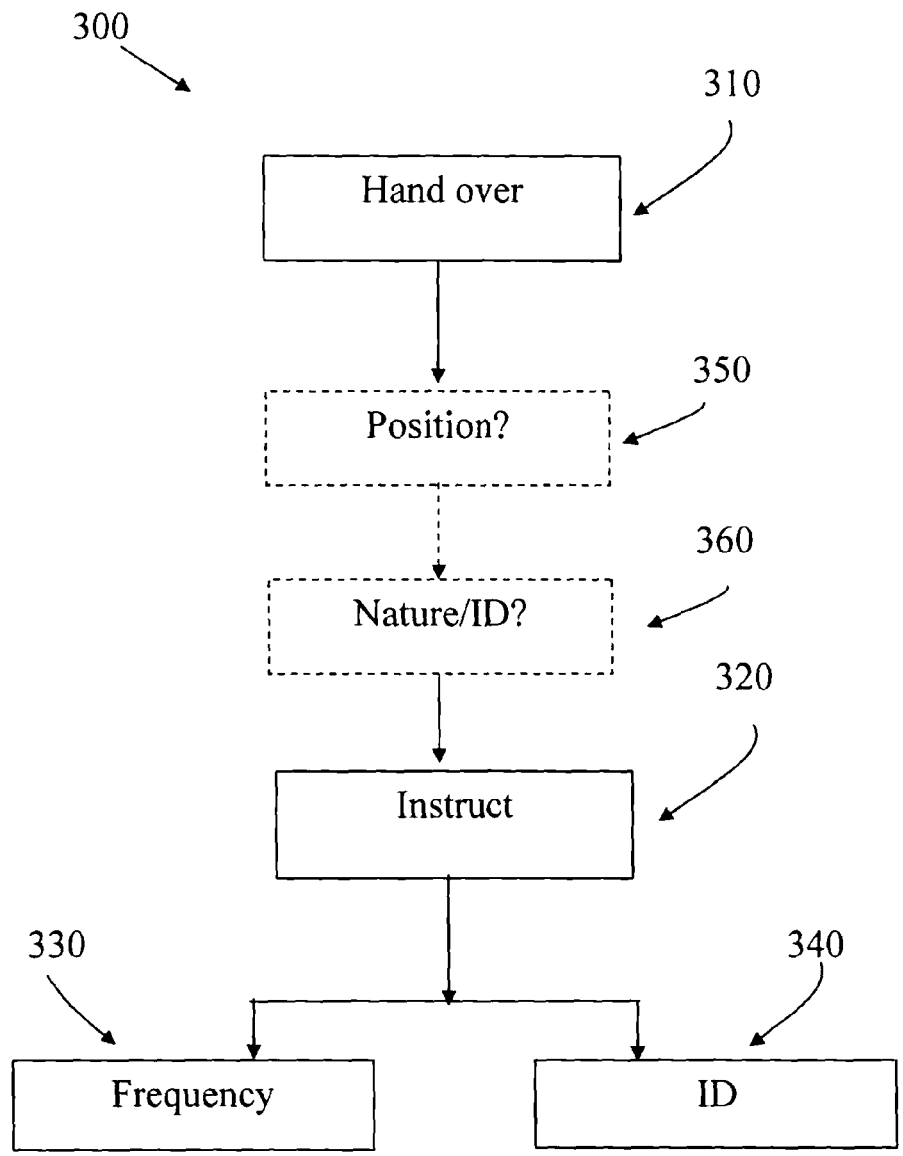
FIG. 3 shows a schematic flow chart of a method of the invention.

FIG. 3 shows a schematic block diagram 300 of some of the steps of the method of the invention. Steps which are options or alternatives are shown with dashed lines.

In step 310, a handover from a Femto/LTE cell 120-122 is detected by the Macro system. Thus, in step 320, the macro system instructs the source BTS regarding at least one of the following:

one or more frequencies on which the source BTS may operate, step 330.
an identity code which may be used by the source BTS, step 340.

As shown in step 350, the Macro system may also determine the position of the source BTS, using the methods described above.

Step 360 shows that in one embodiment of the invention, the instructions from the Macro system will only be sent if the request for handover comprises specific information which makes it possible to identify the nature of the cell of the second kind, or which makes it possible to determine the identity of the cell of the second kind.

Figure 4:
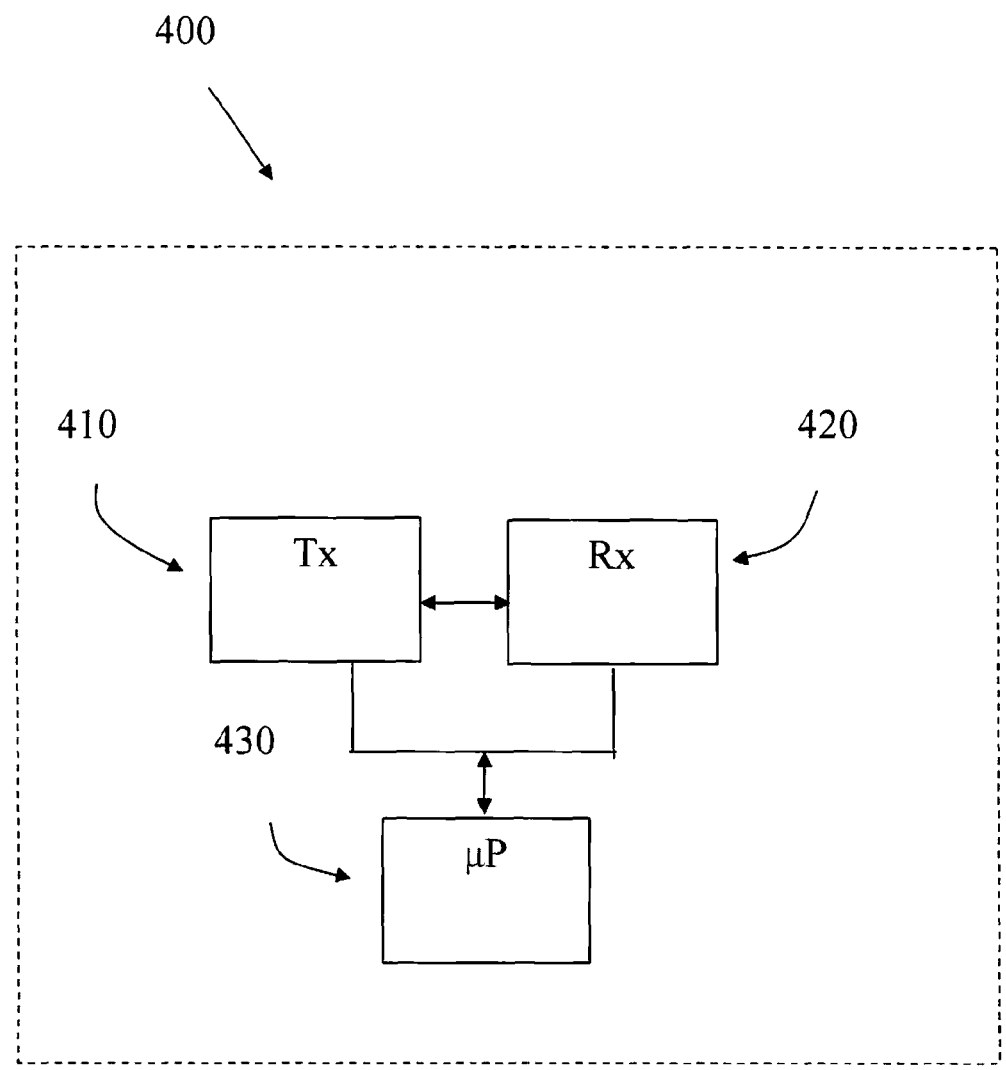
FIG. 4 shows a schematic block diagram of a node of the invention.

Finally, FIG. 4 shows a basic block diagram of a node 400 for use in a network in which the invention is applied. Suitably, the node 400 is a BSC in the Macro system, or a function in the Macro BSC, but the node may also be a stand alone unit, or it may conceivably be comprised in the MSC of the Macro system.

As shown in FIG. 4, the node 400 is equipped with means 420 for receiving messages from other components in the system in which it is comprised, and also with means 410 for sending messages.

In addition, the node 400 is equipped with means 430 for evaluating messages which are received, said means also suitably serving to compose outgoing messages. The means for evaluating and composing messages are suitably a microprocessor or some other computing means.

Thus, the node 400 may detect hand over requests by means of the receiver means 420 in conjunction with the computer 430.

If a hand over request is received from a cell in an unknown BTS, or a BTS in a known Femto/LTE system, the node 400 composes a message with instructions for the "source BTS" using the computing means 430 and sends it by means of the transmitter 410. The contents of the instructions are essentially as described above, and will for that reason not be described here again.

The node 400 may also serve to determine the position of the "source BTS", which is done in the way described previously, by means of the transmit means 410, the receive means 420 and the computing means 430.

Also, the computing means 430 may serve to recognize whether or not the request for handover comprises specific information which makes it possible to identify the nature of the cell of the second kind, and only in that case lets the node 400 send instructions via the transmit means 410. Alternatively, the instructions are only sent if the request for handover comprises specific information which makes it possible to determine the identity of the cell of the second kind.

The invention is not limited to the examples of embodiments shown in the drawings and described above, but may be freely varied within the scope of the appended claims.

For example, the control function of the base station of the second kind, to which the control function for the base station of the first kind sends instructions, may be another node in the system than the BSC, it can for example be an OSS node (Operation and Support System) which is used for supervision and control, and which can either control the Femto BTS directly or via the Femto BSC of the network.

In addition, the functions of the MSC as described above may also be carried out by another node, such as the SGSN, in the case that the traffic is packet switched traffic. In that case, the names of the messages, eg handover request, may differ, but the basic function is the same.

It can also be mentioned that the instructions to the Femto/LTE cells can, for example, be sent at regular intervals, i.e. once per 24 hour period, even if new such cells are discovered more frequently than that. Also, the instructions may be sent even if the Femto/LTE cells are known, but an event in the Macro system causes a need for new frequencies/BSICs etc in the Femto/LTE cells. An example of such an event is a changed frequency plan in the Macro system, which may necessitate new frequencies in the Femto/LTE cells as well.

The invention claimed is:

1. A method for use in a cellular telephony network, said cellular telephony network comprising:
a first number of cells of a first kind comprising a cellular Macro system, each cell, of the first number of cells of the first kind, is configured to accommodate at least a first number of user terminals, with traffic of the user terminals in a cell of the first kind being controlled by a corresponding base station,
a second number of cells of a second kind, each cell, of the second number of cells of the second kind, is configured to accommodate at least a second number of user terminals, with traffic of the user terminals in a cell of the second kind being controlled by a corresponding base station,
said cells of the second kind having a coverage which at least partially coincides with a coverage of one or more cells of the first kind, the cellular telephony network configured to control the base stations of the first and second kinds of cells, and to hand over control of user terminals from one base station to another base station, the method corresponding to a handover of control of a user terminal in a cell of the second kind to a target base station of a cell of the first kind, the method comprising:
receiving a request for handover comprising serving CGI (Cell Global Identity) information that distinguishes between a new BTS (Base Transceiver Station) and a previously-detected BTS, and identifies a type of BTS, wherein the type of BTS distinguishes between a Femto BTS and an LTE (Long Term Evolution) BTS, the request indicating that the control of the user terminal in the cell of the second kind is to be handed over to the target base station of the cell of the first kind;
determining, by a controller associated with the target base station of the cell of the first kind, a position of the cell of the second kind; and
sending, by the controller associated with the target base station of the cell of the first kind, instructions to a controller associated with a serving base station of the cell of the second kind in response to determining the position of the cell of the second kind, the serving CGI information, and a current frequency plan of the cellular Macro system, said instructions comprising information regarding one or more frequencies and a BSIC (Base Station Identity Code) on which the serving base station of the cell of the second kind may operate, to improve coexistence between the cell of the second kind and the first number of cells of the first kind, and between the cell of the second kind and other cells of the second kind in the network.

2. The method of claim 1, where determining the position of the cell of the second kind includes:
determining the position of the cell of the second kind using at least one of:
an identity of the base station to which handover is requested,
timing advance information of the user terminal in the cell to which handover is made,
signal strength of neighboring base stations measured by the user terminal in the cell to which handover is made,
one or more external positioning systems, or
another controller, in the cellular telephony network, configured to determine the position of the cell of the second kind.

3. The method of claim 1, wherein said instructions are sent when the request for handover comprises specific information that allows a nature of the cell of the second kind to be determined.

4. The method of claim 1, wherein said instructions are sent when the request for handover comprises specific information that allows an identity of the cell of the second kind to be determined.

5. The method of claim 1,
wherein the cells of the second kind are significantly smaller than said cells of the first kind, the cells of the second kind being Femto cells, and
wherein sending the instructions comprises sending, by the controller associated with the target base station of the cell of the first kind, instructions to the controller associated with the serving base station of one of the Femto cells that are significantly smaller than said cells of the first kind in response to determining the position of the one of the Femto cells, said instructions comprising information regarding one or more frequencies on which the serving base station of the one of the Femto cells may operate.

6. The method of claim 1, wherein the cells of the second kind are Long Term Evolution (LTE) cells.

7. The method of claim 6, wherein the instructions to the controller associated with the base station of the cell of the second kind comprise information regarding a frequency spectrum on which the base station of the cell of the second kind may operate.

8. The method of claim 1, wherein the cells of the first kind are Global System for Mobile communications (GSM) cells or Wideband Code Division Multiple Access (WCDMA) cells.

9. A node for use in a cellular telephony system, said cellular telephony system comprising a first number of cells of a first kind comprising a cellular Macro system, each cell, of the first number of cells, is configured to accommodate at least a first number of user terminals, with traffic of the user terminals in cells of the first kind being controlled by a corresponding base station, the cellular telephony system configured to control the base stations in the cells of the first kind, and to hand over control of user terminals from one base station to another base station, the node comprising:
a receiver configured to detect a handover request comprising serving CGI (Cell Global Identity) information that distinguishes between a new BTS (Base Transceiver Station) and a previously-detected BTS, and identifies a type of BTS, wherein the type of BTS distinguishes between a Femto BTS and an LTE (Long Term Evolution) BTS, to a target base station of a cell of the first kind from a user terminal located in a cell of the second kind, said cell of the second kind being connected to a corresponding serving base station, the serving base station of the cell of the second kind being connected to an associated controller that is configured to control the serving base station of the cell of the second kind;
a processor configured to determine a position of the cell of the second kind; and
a transmitter configured to send instructions to the controller associated with the serving base station of the cell of the second kind, from which serving base station of the cell of the second kind the user terminal is to be handed over to the target base station of the cell of the first kind, in response to determining the position of the cell of the second kind, the serving CGI information, and a current frequency plan of the cellular Macro system, said instructions comprising information regarding one or more frequencies and a BSIC (Base Station Identity Code) on which the serving base station of the cell of the second kind may operate, to improve coexistence between the cell of the second kind and the first number of cells of the first kind, and between the cell of the second kind and other cells of the second kind in the system.

10. The node of claim 9, where the node is located in a controller associated with the base stations of the cells of the first kind.

11. The node of claim 9, wherein the processor is configured to determine the position using at least one of:
an identity of the base station to which handover is requested,
timing advance information of the user terminal in the cell to which handover is made,
signal strength of neighboring base stations measured by the user terminal in the cell to which handover is made,
one or more external positioning systems, or
another controller, in the cellular telephony system, configured to determine the position of the cell of the second kind.

12. The node of claim 9, where said instructions are sent in response to the request for handover comprising specific information that allows a nature of the cell of the second kind to be determined.

13. The node of claim 9, where said instructions are sent in response to the request for handover comprising specific information that allows an identity of the cell of the second kind to be determined.

14. The node of claim 9, where the node is a Base Station Controller (BSC) in the cellular telephony system.

15. The node of claim 9, where said node is located in a Base Station Controller (BSC) in the cellular telephony system.

16. The node of claim 9, where said node is located in a Mobile Switching Center (MSC), in the cellular telephony system.

17. The method of claim 1,
wherein the base station of the cell of the second kind from which the control of the user terminal is to be handed over is new to a coverage area of the cell of the first kind, and
wherein sending the instructions comprises sending, by the controller associated with the target base station of the cell of the first kind, instructions to the controller associated with the serving base station of the cell of the second kind that is new to the coverage area in response to determining the position of the cell of the second kind, said instructions comprising information regarding one or more frequencies on which the serving base station of the cell of the second kind that is new to the coverage area may operate.

18. The method of claim 17, wherein the controller of the base station of the cell of the first kind is configured to determine that the base station of the cell of the second kind is new to the coverage area by determining that the controller of the base station of the cell of the first kind does not have information about the base station of the cell of the second kind.

19. The method of claim 1, wherein sending the instructions comprises sending the instructions for the serving base station of the cell of the second kind, from which the user terminal is to be handed over to the target base station of the cell of the first kind, in response to receiving the request for handover and in response to determining the position.

20. The method of claim 1, wherein:
the information further comprises information regarding an identity code which may be used by the serving base station of the cell of the second kind; and
sending the instructions further comprises sending the instructions comprising the information regarding the one or more frequencies on which the serving base station of the cell of the second kind may operate and the information regarding the identity code which may be used by the serving base station of the cell of the second kind.

\* \* \* \* \*